United States Patent
Park et al.

(10) Patent No.: US 8,218,896 B2
(45) Date of Patent: Jul. 10, 2012

(54) IMAGE DISPLAY APPARATUS AND METHOD FOR CORRECTION CHROMA WRINKLE

(75) Inventors: Bo-gun Park, Suwon-si (KR); Mi-yeon Lee, Suwon-si (KR); Seung-joon Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 959 days.

(21) Appl. No.: 12/293,899

(22) PCT Filed: Oct. 2, 2006

(86) PCT No.: PCT/KR2006/003968
§ 371 (c)(1),
(2), (4) Date: Sep. 22, 2008

(87) PCT Pub. No.: WO2007/108582
PCT Pub. Date: Sep. 27, 2009

(65) Prior Publication Data
US 2009/0034859 A1    Feb. 5, 2009

(30) Foreign Application Priority Data

Mar. 22, 2006 (KR) .................. 10-2006-0026296

(51) Int. Cl.
*G06K 9/40* (2006.01)

(52) U.S. Cl. .......................................... 382/275; 382/167
(58) Field of Classification Search .................. 382/167, 382/275
See application file for complete search history.

(56) References Cited

U.S. PATENT DOCUMENTS

| 6,009,192 | A | * | 12/1999 | Klassen et al. | 382/167 |
| 6,078,686 | A | | 6/2000 | Kim | |
| 6,507,372 | B1 | | 1/2003 | Kim | |
| 7,227,895 | B1 | * | 6/2007 | Wang et al. | 375/240.16 |

* cited by examiner

*Primary Examiner* — Tom Y Lu
(74) *Attorney, Agent, or Firm* — Sughrue Mion, PLLC

(57) ABSTRACT

An image display apparatus and a color distortion compensation method are provided. The image display apparatus includes a detecting part which detects whether there is a color distortion in a block, using decoding information acquired from an incoming image and a pixel value of the incoming image, and a compensation part which compensates for the color distortion of the block when it is determined that the color distortion exists. Accordingly, it is possible to detect a color distortion in the block using the decoding information and pixel value acquired from the incoming image, and compensate for the color distortion of the block by performing pixel value adjustment and low pass filtering (LPF) when it is determined that the color distortion exists.

24 Claims, 2 Drawing Sheets

○ DCT ENERGY > REFERENCE ENERGY
● DCT ENERGY ≅ 0

[Fig. 5]

IMAGE DISPLAY APPARATUS AND METHOD FOR CORRECTION CHROMA WRINKLE

This application is a National Stage of International Application No. PCT/KR2006/003968 filed Oct. 2, 2006 and claims priority Korean Patent Application No. 10-2006-0026296 filed on Mar. 22, 2006, in the Korean Intellectual Property Office, the disclosure of which is incorporated herein in its entirety by reference.

BACKGROUND OF THE INVENTION

1. Field of the Invention

The present invention relates to an image display apparatus and a method of correcting chroma wrinkles, and more particularly, to an image display apparatus which detects chroma wrinkles existing in blocks and corrects the chroma wrinkles by adjusting the pixel values of the blocks, and a method of chroma wrinkles correction thereof.

2. Description of the Related Art

An image display apparatus operates to process incoming video signals and display the signals through a screen, and typical examples of the image display apparatus include televisions, and computer monitors.

The image display apparatus generally uses standard compression of MPEG, H.263 based on the discrete cosine transform (DCT). The DCT converts the image signal, being represented by the luminance and color difference, into frequency region of a space and then un-converts the frequency region.

The DCT algorithm uses (n×n) pixels, called as 'blocks', as its basic unit. That is, one screen is partitioned into a plurality of blocks and DCT coefficients are obtained by repeating the DCT algorithm with each of the blocks. The decoder recovers the DCT coefficients being received from the encoder into original pixel values.

Interlace scanning, which is one of the scanning methods used in the image display apparatus, divides one image frame into two fields and alternately indicates through the screen in a sequence to display one image. These two divided fields are generally called top and bottom fields, upper and lower fields, or odd and even fields.

In the image display apparatus using interlace scanning, color distortion is generated during recovery of compressed image, if luminance between two fields changes abruptly or motion changes too dynamically. Such color distortion usually includes color variation from original color in certain local areas, or repeated wrinkles on the screen.

However, a conventional image display apparatus directly enters into image post-processing and does not correct the color distortion when it occurs. As a result, it is difficult to recover the original image.

SUMMARY OF THE INVENTION

The present invention provides an image display apparatus which detects chroma wrinkles using decoding information and pixel values to recover an original image, and corrects the chroma wrinkles by adjusting the pixel values within the blocks, and a chroma wrinkles correcting method thereof.

According to the present invention, chroma wrinkles existing in the blocks can be detected by using the decoding information and pixel values acquired from the input image, and upon determination that chroma wrinkles exists, the chroma wrinkles can be corrected by performing the adjustment of pixel values within the blocks and low-pass filtering (LPF).

According to an aspect of the present invention, there is provided an image display apparatus according to the present invention includes a detecting unit which detects the presence of chroma wrinkles in blocks, using decoding information acquired from an input image and pixel values of the input image; and a correction unit which corrects the chroma wrinkles of the blocks, upon determination that the chroma wrinkles exist in the blocks.

The detecting unit may determine that the chroma wrinkles exist in the blocks, if DCT energies of first columns of first and last rows of the blocks exceed a predetermined reference energy, and if DCT energies, excluding the first columns of the first and the last rows of the blocks, are close to 0.

The detecting unit may further comprise a computation unit which computes DCT energies of the blocks using the decoding information, computes pixel sums using the pixel values, computes a first and a second averages of pixel sums using the pixel sums, and computes differences of average pixel sums of the even fields and the odd fields using the first and the second averages of pixel sums, and the correction unit may adjust the pixel sums of the even fields close to the first average of pixel sums of the even fields, if the detecting unit detects the chroma wrinkles in the blocks, and adjusts the pixel sums of the odd fields close to the first average of pixel sums of the odd fields computed at the computation unit.

The computation unit may compute the pixel sums by adding the pixel values of the respective lines of the even fields and the odd fields, compute the first average of pixel sums by adding the pixel sums of the lines, excluding the first and the last lines, of the even fields and the odd fields and averaging the obtained sum, compute the second average of pixel sums by adding the pixel sums of the first and the second lines and averaging the obtained sum, and compute the difference of average pixel sums based on the difference between the first and the second averages of pixel sums.

The detecting unit may further comprise a comparison unit which compares the DCT energies computed at the computation unit with a predetermined reference energy, compares the motion vectors of the blocks with a first and a second predetermined reference motion vectors, compare quantization coefficients of the blocks with a first and a second predetermined quantization coefficients, and compare the differences of average pixel sums of the even fields and the odd fields with a predetermined reference pixel difference, and the correction unit, according to the result of comparison at the comparison unit, may adjust the pixel sums of the eve fields close to the first average of pixel sums of the even fields computed at the computation unit, and adjusts the pixel sums of the odd fields close to the first average of pixel sums of the odd fields computed at the computation unit.

That is, the correction unit, upon determination that the first average of pixel sums exceed the second average of pixel sums according to the result of comparison at the comparison unit, adjusts the pixel sums below the first average of pixel sums of the even fields, close to the first average of pixel sums, and adjusts the pixel sums exceeding the first average of pixel sums of the odd fields, close to the first average of pixel sums.

The correction unit, upon determination that the first average of pixel sums is below the second average of pixel sums according to the result of comparison at the comparison unit, may adjust the pixel sums exceeding the first average of pixel sums of the even fields, close to the first average of pixel sums, and adjust the pixel sums below the first average of pixel sums of the odd fields, close to the first average of pixel sums.

The detecting unit may further comprise a determination unit which determines that chroma wrinkles exist in the blocks, if the DCT energies of first columns of first and last rows of the blocks being compared at the comparison unit exceed the predetermined reference energy, and if the DCT energies, excluding the first columns of the first and the last rows of the blocks, are close to 0, determines that the chroma wrinkles exist in the blocks, if the average pixel differences of the even fields and the odd fields being compared at the comparison unit exceed the predetermined reference pixel differences.

The correction unit may make a final determination that the chroma wrinkles exist in the blocks, if the motion vectors of the blocks being compared at the comparison unit are between the first and the second predetermined reference motion vectors, and if the quantization coefficients of the blocks are between the first and the second predetermined reference quantization coefficients, and adjust the pixel sums of the even fields and the odd fields, close to the first averages of pixel sums of the even fields and the odd fields being computed at the computation unit.

The correction unit may determine that the chroma wrinkles exist in the blocks and conducts low pass filtering of the blocks, if the motion vectors and the quantization coefficients of the blocks being compared at the comparison unit exceed the second reference motion vector and quantization coefficient, and determine that the chroma wrinkles do no exist in the blocks, if the motion vectors and the quantization coefficients of the blocks being compared at the comparison unit are below the first predetermined reference motion vector and quantization coefficient.

A decoder which recovers the pixel values contained in the fields by decoding the input image, and outputs a decoding information acquired from the input image to the detecting unit, may be further provided.

The decoding information may comprise at least one of the motion vectors, the quantization coefficients and the DCT coefficients of the blocks.

According to another aspect of the present invention, there is provided a method of correcting chroma wrinkles, comprising: detecting the presence of chroma wrinkles in blocks, using decoding information acquired from an input image and pixel values of the input image; and correcting the chroma wrinkles of the blocks, upon determination that the chroma wrinkles exist in the blocks.

The detecting step may determine that the chroma wrinkles exist in the blocks, if DCT energies of first columns of first and last rows of the blocks exceed a predetermined reference energy, and if DCT energies, excluding the first columns of the first and the last rows of the blocks, are close to 0.

The detecting step may further comprise a computation step which computes DCT energies of the blocks using the decoding information, computes pixel sums using the pixel values, computes a first and a second averages of pixel sums using the pixel sums, and computes differences of average pixel sums of the even fields and the odd fields using the first and the second averages of pixel sums, and the correction step may adjust the pixel sums of the even fields close to the first average of pixel sums of the even fields, if the detecting step detects the chroma wrinkles in the blocks, and adjust the pixel sums of the odd fields close to the first average of pixel sums of the odd fields computed at the computation step.

The computation step may compute the pixel sums by adding the pixel values of the respective lines of the even fields and the odd fields, compute the first average of pixel sums by adding the pixel sums of the lines, excluding the first and the last lines, of the even fields and the odd fields and averaging the obtained sum, compute the second average of pixel sums by adding the pixel sums of the first and the second lines and averaging the obtained sum, and compute the difference of average pixel sums based on the difference between the first and the second averages of pixel sums.

The detecting step may further comprise a comparison step which compares the DCT energies computed at the computation step with a predetermined reference energy, compares the motion vectors of the blocks with a first and a second predetermined reference motion vectors, compares quantization coefficients of the blocks with a first and a second predetermined quantization coefficients, and compares the differences of average pixel sums of the even fields and the odd fields with a predetermined reference pixel difference, and the correction step, according to the result of comparison at the comparison step, may adjust the pixel sums of the even fields close to the first average of pixel sums of the even fields computed at the computation step, and adjust the pixel sums of the odd fields close to the first average of pixel sums of the odd fields computed at the computation step.

The correction step, upon determination that the first average of pixel sums exceed the second average of pixel sums according to the result of comparison at the comparison step, may adjust the pixel sums below the first average of pixel sums of the even fields, close to the first average of pixel sums, and adjust the pixel sums exceeding the first average of pixel sums of the odd fields, close to the first average of pixel sums.

The correction step, upon determination that the first average of pixel sums is below the second average of pixel sums according to the result of comparison at the comparison step, may adjust the pixel sums exceeding the first average of pixel sums of the even fields, close to the first average of pixel sums, and adjust the pixel sums below the first average of pixel sums of the odd fields, close to the first average of pixel sums.

The detecting step may further comprise a determination step which determines that chroma wrinkles exist in the blocks, if the DCT energies of first columns of first and last rows of the blocks being compared at the comparison step exceed the predetermined reference energy, and if the DCT energies, excluding the first columns of the first and the last rows of the blocks, are close to 0, determines that the chroma wrinkles exist in the blocks, if the average pixel differences of the even fields and the odd fields being compared at the comparison step exceed the predetermined reference pixel differences.

The correction step may make a final determination that the chroma wrinkles exist in the blocks, if the motion vectors of the blocks being compared at the comparison step are between the first and the second predetermined reference motion vectors, and if the quantization coefficients of the blocks are between the first and the second predetermined reference quantization coefficients, and adjust the pixel sums of the even fields and the odd fields, close to the first averages of pixel sums of the even fields and the odd fields being computed at the computation step.

The correction step may determine that the chroma wrinkles exist in the blocks and conducts low pass filtering of the blocks, if the motion vectors and the quantization coefficients of the blocks being compared at the comparison step exceed the second reference motion vector and quantization coefficient, and determine that the chroma wrinkles do no exist in the blocks, if the motion vectors and the quantization coefficients of the blocks being compared at the comparison step are below the first predetermined reference motion vector and quantization coefficient.

A step of recovering the pixel values contained in the fields by decoding the input image, and outputting a decoding information acquired from the input image, may be further provided.

According to another aspect of the present invention, there is provided an apparatus for detecting chroma wrinkles, comprising: a decoder which recovers pixel values contained in fields by decoding an input image, and outputting a decoding information acquired from the input image; and a detecting unit which detects the presence of the chroma wrinkles in blocks, using the decoding information and the pixel values.

The detecting unit may determine that the chroma wrinkles exist in the blocks, if a DCT energy of first columns of first and last rows of the blocks exceed a predetermined reference energy, and if a DCT energy, excluding the first columns of the first and the last rows of the blocks, is close to 0.

The detecting unit may further comprise: a computation unit which computes the DCT energies of the blocks using the decoding information, computes pixel sums using the pixel values, computes a first and a second averages of pixel sums using the pixel sums, and computes average pixel differences of the even fields and the odd fields constituting the input image, using the first and the second averages of pixel sums; a comparison unit which compares the DCT energies being computed at the computation unit with a predetermined reference energy, compares motion vectors of the blocks with a first and a second predetermined reference motion vectors, compares quantization coefficients of the blocks with a first and a second predetermined reference quantization coefficients, and compares the average pixel differences of the even fields and the odd fields with a predetermined reference pixel difference; and a determination unit which determines the presence and absence of the chroma wrinkles in the blocks according to the result of comparison at the comparison unit.

The determination unit may determine that the chroma wrinkles exist in the blocks, if the DCT energies of first columns of first and last rows of the blocks being compared at the comparison unit exceed the predetermined reference energy, and if the DCT energies, excluding the first columns of the first and the last rows of the blocks, are close to 0, and determine that the chroma wrinkles exist in the blocks, if the average pixel differences of the even fields and the odd fields being compared at the comparison unit exceed the predetermined reference pixel differences, respectively.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE EXEMPLARY EMBODIMENTS

The exemplary embodiments of the present invention will be explained in greater detail below with reference to the accompanying drawings.

Figure 1:
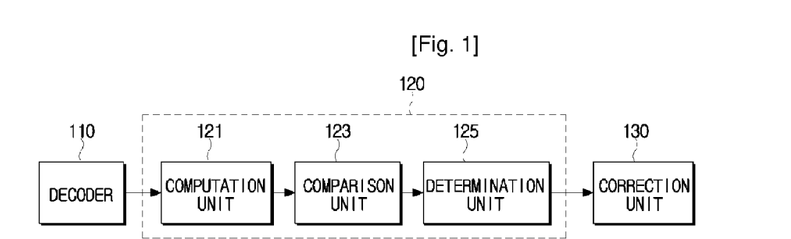
FIG. 1 is a block diagram of an image display apparatus according to an exemplary embodiment of the present invention.
Figure 2:
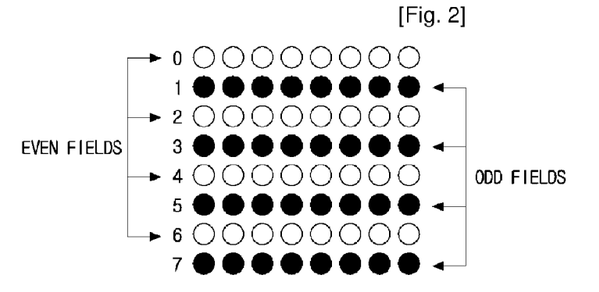
FIGS. 2 and 3 illustrate a method of correcting chroma wrinkles using pixel values.
Figure 3:
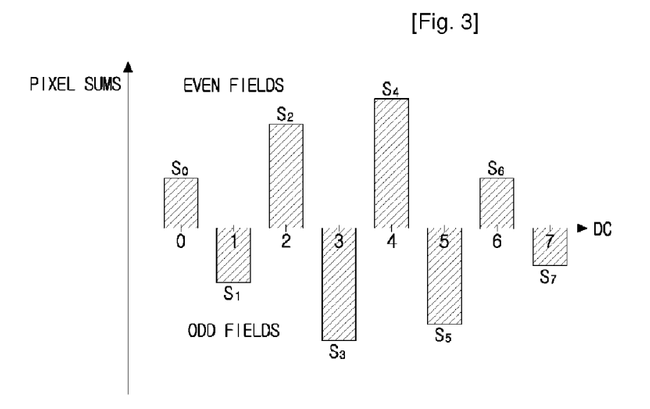
Figure 4:
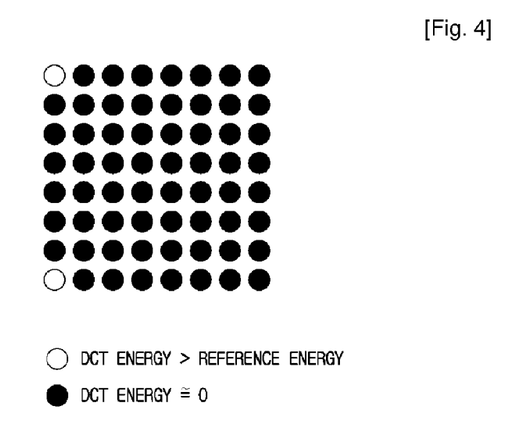
FIG. 4 illustrates a method of detecting chroma wrinkles using DCT coefficient.

FIG. 1 is a block diagram of an image display apparatus according to an exemplary embodiment of the present invention, FIGS. 2 and 3 illustrate a method of correcting chroma wrinkles using pixel values, and FIG. 4 illustrates a method of detecting chroma wrinkles using DCT coefficient.

First, referring to FIGS. 1 to 4, the image display apparatus includes a decoder 110, a detecting unit 120, and a correction unit 130. An exemplary implementation of the present invention may use an image which applies 8×8 block-based compression algorithm, which will be explained below.

The decoder 110 decodes the input image into pixel values constituting the field, and outputs the decoding information acquired from the input image. The 'decoding information' includes motion vector, discrete cosine transform (DCT) coefficient, inter/intra/skip block mode, and quantization coefficient. The DCT coefficient is a 2-dimensional coefficient, and output blockwise.

The detecting unit 120 computes DCT energy using the decoding information received from the decoder 110, and computes a sum of pixels of each line of each field to detect the presence of chroma wrinkles in the blocks. The detecting unit 120 includes a computation unit 121, a comparison unit 123 and a determination unit 125.

The computation unit 121 computes DCT energy using the decoding information received from the decoder 110. The DCT energy is computed by squaring the DCT coefficient included in the decoding information. In other words, with referring to FIG. 4, the computation unit 121 obtains 8×8 DCT energies.

Additionally, the computation unit 121 obtains the sum of pixels by adding up all the pixel values of each line of even and odd fields, and generates a histogram regarding the sums of pixels ($S_0$ to $S_7$) of each line. Referring to FIGS. 2 and 3, the computation unit 121 adds up all the pixel values of line 0 to compute the sum $S_0$, and repeats the summation from line 1 to line 7 to compute the sums $S_1$ to $S_7$, and accordingly generates a histogram.

The computation unit 121 also computes a first average of pixel sums and a second average of pixel sum of the even fields and the odd fields, using the sums of pixels.

More specifically, the computation unit 121 computes the first average of pixel sums $$\left(\frac{|S_2|+|S_4|}{2}, \frac{|S_3|+|S_5|}{2}\right),$$

by summing all the lines of the even and the odd fields (even lines: $S_0$, $S_6$, odd lines: $S_1$, $S_7$), excluding the first and the last lines, and averaging the sums, and also computes the second average of pixel sums $$\left(\frac{|S_0|+|S_6|}{2}, \frac{|S_1|+|S_7|}{2}\right),$$

by summing the first and the last lines of the even fields and the odd fields (even fields: $S_0$, $S_6$, odd fields: $S_1$, $S_7$), and averaging the sums.

Additionally, the computation unit 121 computes differences of average pixels $$\left(\left|\frac{|S_2|+|S_4|}{2}-\frac{|S_0|+|S_6|}{2}\right|, \left|\frac{|S_3|+|S_5|}{2}-\frac{|S_1|+|S_7|}{2}\right|\right),$$

that is, the difference between the first average of pixel sums and the second average of pixel sums of the even fields and the odd fields, respectively.

The comparison unit 123 compares the DCT energies of the blocks obtained by the computation unit 121 with a predetermined reference energy. The comparison unit 123 then compares the motion vector of the blocks $$(|\overrightarrow{MV}|)$$

with a first and a second predetermined motion vectors $$(|\overrightarrow{MV_{th1}}|, |\overrightarrow{MV_{th2}}|),$$

and compares the quantization coefficient ($|Q_{th1}|$) with a first and a second reference quantization coefficients ($|Q_{th1}|$, $|Q_{th2}|$).

Additionally, the comparison unit 123 compares the differences of average pixels of the even fields and the odd fields computed at the computation unit 121 with a predetermined reference pixel difference.

The determination unit 123 determines that the block has the chroma wrinkle, if the result of the comparison unit 123 indicates that the DCT energy at the first column of the first and the last rows of the 2-dimensional DCT coefficient of the block exceeds a reference energy ($E_{0,0} > E_{th}, E_{7,0} > E_{th}$), and if the DCT energy excluding the first column of the first and the last rows is close to 0

$$(E_0|E_0\%O, E_0|E_0\%O, E_0|E_0\%O).$$

That is, if the DCT energy has the pattern as illustrated in FIG. 4, the determination unit 125 determines that chroma wrinkles exist in the block.

Additionally, the determination unit 125 determines the presence of chroma wrinkles in the block, based on the result of comparison of the comparison unit 121 between the differences of average pixels and the predetermined pixel difference of the even fields and the odd fields.

That is, if the result of comparison at the comparison unit 123 indicates that the differences of average pixels of the even fields and the odd fields exceed the predetermined reference pixel difference $$\left(\left|\frac{|S_2|+|S_4|}{2}-\frac{|S_0|+|S_6|}{2}\right|>|S_{th}|\right),$$

$$\left(\left|\frac{|S_3|+|S_5|}{2}-\frac{|S_1|+|S_7|}{2}\right|>|S_{th}|\right),$$

the determination unit 125 determines that the block has the chroma wrinkles.

The correction unit 130 operates to determine the presence of chroma wrinkles in the blocks determined by the determination unit 125. Upon determination at the determination unit 125 that chroma wrinkles exist in the block, as a final step of determination, the correction unit 130 detects the chroma wrinkles of the blocks using the motion vectors and the quantization coefficients of the blocks. The correction unit 130 corrects the chroma wrinkles of the blocks by adjusting the pixel sums computed at the computation unit 121.

More specifically, if the motion vectors of the blocks compared at the comparison unit 123 exist between the first and the second predetermined motion vectors $$(|\overrightarrow{MV_{th1}}|<|\overrightarrow{MV}|<|\overrightarrow{MV_{th2}}|),$$

and if the quantization coefficients of the blocks exist between the first and the second predetermined quantization coefficients $$(|Q_{th1}|<|Q|<|Q_{th2}|),$$

the correction unit 130 determines that the chroma wrinkles exist in the blocks. The correction unit 130 adjusts the pixel sums of the lines of the even fields and the odd fields ($S_0$ to $S_7$) to approximate to the first average of pixel sums $$\left(\frac{|S_2|+|S_4|}{2}, \frac{|S_3|+|S_5|}{2}\right)$$

of the respective fields.

Additionally, if the motion vectors of the blocks compared at the comparison unit 123 and the quantization coefficients exceed the second predetermined motion vector and the second reference quantization coefficient $$(|\overrightarrow{MV}|E|\overrightarrow{MV_{th2}}|, |Q|E|Q_{th2}|),$$

the correction unit 130 determines that the blocks have chroma wrinkles and conducts low pass filtering of the blocks.

Additionally, if the motion vectors of the blocks compared at the comparison unit 123 and the quantization coefficients do not exceed the first predetermined motion vector and the first reference quantization coefficient $$(|\overrightarrow{MV}|D|\overrightarrow{MV_{th1}}|, |Q|D|Q_{th1}|),$$

the correction unit 130 determines that the blocks do not have chroma wrinkles and thus, does not conduct correction of chroma wrinkles.

Figure 5:
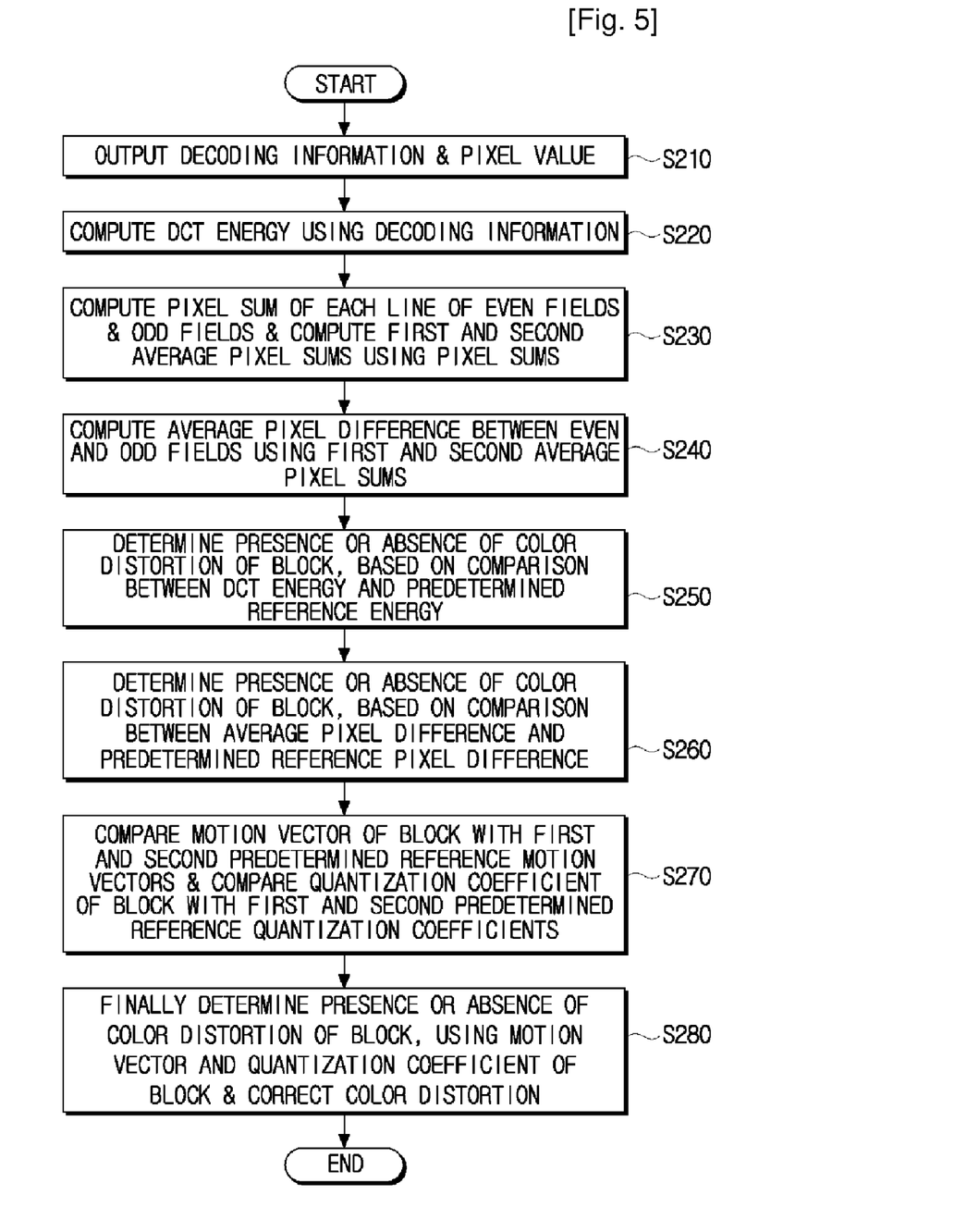
FIG. 5 is a flowchart illustrating a method of correcting chroma wrinkles of an image display apparatus according to an exemplary embodiment of the present invention.

FIG. 5 is a flowchart illustrating a method of correcting chroma wrinkles of an image display apparatus according to an exemplary embodiment of the present invention.

Referring to FIG. 5, first, the decoder 110 recovers the decoding information and the pixel values constituting field of the input image and outputs the resultant data (S210). The decoding information may include a motion vector, a Discrete Cosine Transform (DCT) coefficient, an Inter/Intra/Skip block mode, and a Quantization value (Q). The DCT coefficient is 2-dimensional, and output blockwise.

Next, the computation unit 121 computes DCT energy by using the decoding information (S220). The DCT energy is the square of the DCT coefficient, and 8×8 DCT energies are computed.

The computation unit 121 computes pixel sums ($S_0$ t0 $S_7$) of the pixel values of each line of the even fields and the odd fields, and computes the first average of pixel sums and the second average of pixel sums using the computed pixel sums (S230). The computation unit 121 generates a histogram of the pixel sums of the respective lines, using the computed pixel sums.

In detail, referring to FIGS. 2 and 3, the computation unit 121 sums the pixel values of 0, 2, 4, 6 lines of the even fields (FIG. 2) to compute the pixel sums ($S_0$, $S_2$, $S_4$, $S_6$) of the respective lines, and sums the pixel values of 1, 3, 5, 7 lines of the odd fields to compute the pixel sums ($S_1$, $S_3$, $S_5$, $S_7$) of the respective lines.

Additionally, the computation unit 121 computes the first average of pixel sums $$\left(\frac{|S_2|+|S_4|}{2}\right),$$

by summing the pixel sums ($S_2$, $S_4$) of the lines of the even fields, excluding the first and the last lines, and averaging the obtained sum, and also computes the second average of pixel sums $$\left(\frac{|S_0|+|S_6|}{2}\right),$$

by summing the pixel sums ($S_0$, $S_6$) of the first and the last lines of the even fields and averaging the obtained sum.

Likewise, the computation unit 121 computes a first average $$\left(\frac{|S_3|+|S_5|}{2}\right)$$

of pixel sums of the odd fields, by summing the pixel sums ($S_3$, $S_5$) of all the lines of the odd fields, excluding the first and the last lines, and averaging the obtained sum, and also computes a second average $$\left(\frac{|S_1|+|S_7|}{2}\right)$$

of pixel sums of odd fields, by summing the pixel sums ($S_1$, $S_7$) of the first and the last lines of the odd fields and averaging the obtained sum.

The computation unit 121 then computes the average pixel difference between the two fields, using the first average of pixel sums and the second average of pixel sums of the even fields and the odd fields (S240).

In detail, the computation unit 121 computes the difference of the first and the second averages of pixel sums of the even fields to obtain an average pixel difference $$\left(\left|\frac{|S_2|+|S_4|}{2}-\frac{|S_0|+|S_6|}{2}\right|\right)$$

of the even fields, and computes the difference of the first and the second averages of pixel sums of the odd fields to obtain an average pixel difference $$\left(\left|\frac{|S_3|+|S_5|}{2}-\frac{|S_1|+|S_7|}{2}\right|\right)$$

of the odd fields.

The determination unit 125 determines the presence of chroma wrinkles in blocks, according to the result of comparison between the DCT energies and the predetermined reference energy (S250).

Accordingly, as shown in FIG. 4, if the DCT energies of the blocks, excluding the first columns of the first and the last rows, are close to 0, ($E_0|E_{0,1}\%O, E_{0,1}|E_0\%O, E_0|E_{7,0}\%O$), and if the DCT energies of the first columns of the first and the last rows of the blocks exceed the reference energy ($E_{0,0} > E_{th}$, $E_{7,0} > E_{th}$), the determination unit 125 determines that the blocks have chroma wrinkles.

Additionally, the determination unit 125 determines the presence of the chroma wrinkles of the blocks according to the result of comparison between the average pixel difference and the predetermined reference pixel difference (S260).

More specifically, if the comparison at the comparison unit 123 indicates that the average pixel differences of the even fields and the odd fields computed at S230 exceed the predetermined reference pixel differences $$\left(\left|\frac{|S_2|+|S_4|}{2}-\frac{|S_0|+|S_6|}{2}\right|>|S_{th}|\right),$$

$$\left(\left|\frac{|S_3|+|S_5|}{2}-\frac{|S_1|+|S_7|}{2}\right|>|S_{th}|\right),$$

the determination unit 125 determines that the blocks have the chroma wrinkles.

That is, the determination unit 125 determines that the chroma wrinkles exist in the blocks, if the histogram of the pixel sums of the even fields and the odd fields shows a convex parabolic pattern which gradually increases and then decreases, or if the histogram of the pixel sums of the respective lines of the even fields and the odd fields shows a concave parabolic pattern which gradually decreases and then increases.

After that, the comparison unit 123 compares the motion vectors of the blocks with the first and the second predetermined reference motion vectors, and compares the quantization coefficients of the blocks with the first and the second predetermined quantization coefficients (S270).

The correction unit 130 makes the final determination of the presence of chroma wrinkles in blocks, using the motion vectors and the quantization coefficients of the blocks, and corrects the chroma wrinkles in blocks (S280). In other words, if the chroma wrinkles are determined to exist in blocks at S230, in order to confirm the chroma wrinkles determined at S230, the correction unit 130 determines the presence of the chroma wrinkles in blocks once again, using the motion vectors and the quantization coefficients.

That is, the correction unit 130 determines that the color wrinkles exist in blocks, if the motion vectors of the blocks being compared at S270 are between the first and the second predetermined reference motion vectors ($|\overrightarrow{MV_{th1}}|<|\overrightarrow{MV}|<|\overrightarrow{MV_{th2}}|$), , and if the quantization coefficients of the blocks are between the first and the second predetermined quantization coefficients ($|Q_{th1}|<|Q|<|Q_{th2}|$).

Referring now to FIG. 3, the correction unit 130 adjusts the pixel sums ($S_0$, $S_2$, $S_4$, $S_6$) of the respective lines of the even fields close to the first average $$\left(\frac{|S_2|+|S_4|}{2}\right)$$

of pixel sums of the even fields, and adjusts the pixel sums ($S_1$, $S_3$, $S_5$, $S_7$) of the respective lines of the odd fields close to the first average $$\left(\frac{|S_3|+|S_5|}{2}\right)$$

of pixel sums of the odd fields.

Additionally, if the motion vectors and the quantization coefficients of the blocks compared at S270 exceed the second predetermined reference motion vector and quantization coefficient $$(|\vec{MV}|E|\vec{MV_{th2}}|,|Q|E|Q_{th2}|),$$

the correction unit 130 determines that the chroma wrinkles exist in blocks and accordingly conducts low pass filtering of the blocks.

If the motion vectors and the quantization coefficients of the blocks compared at S270 do not exceed the first predetermined reference motion vector and quantization coefficient $$(|\vec{MV}|D|\vec{MV_{th1}}|,|Q|D|Q_{th1}|),$$

the correction unit 160 determines that the blocks do not contain chroma wrinkles and thus do not conduct chroma wrinkle correction.

That is, the correction unit 130 determines that the color of pre-compression pixels has similar characteristics to chroma wrinkles, but the chroma wrinkles do not occur in the blocks, if the motion vectors and the quantization coefficients of the blocks do not exceed the first predetermined reference motion vectors and quantization coefficients.

According to an aspect of the present invention, if the first average of pixel sums exceeds the second average of pixel sums, that is, if the histogram is in convex parabolic pattern as illustrated in FIG. 3, the correction unit 130 adjusts the pixel sums of the even fields below the first average of pixel sums of the even fields, close to the first average of pixel sums. Additionally, the correction unit 130 adjusts the pixel sums of the odd fields exceeding the first average of pixel sums of the odd fields close to the first average of pixel sums. As a result, chroma wrinkles of the blocks are corrected.

If the first average of pixel sums does not exceed the second average of pixel sums, that is, if the histogram is in concave parabolic pattern, the correction unit 130 adjusts the pixel sums of the even fields exceeding the first average of pixel sums of the even fields, close to the first average of pixel sums. Additionally, the correction unit 130 adjusts the pixel sums of the odd fields below the first average of pixel sums of the odd fields, close to the first average of pixel sums.

With an image display apparatus and a chroma wrinkle correction method according to the present invention, in detecting and correcting chroma wrinkles in an image applying 4×4 block-based compression algorithm, the detecting unit 120 determines chroma wrinkles exist in blocks, if the difference of the pixel sums of the even fields and the difference of the pixel sums of the odd fields exceed the predetermined reference differences.

The correction unit 130 adjusts the pixel sums close to the average of pixel sums of the even fields, if the pixel sums are below the average of the pixel sums of the even fields, and adjusts the pixel sums close to the average of pixel sums of the odd fields, if the pixel sums exceed the average of pixel sums of the odd fields. As a result, chroma wrinkles of blocks are detected and corrected.

Detection and correction of chroma wrinkles of image using pixel values have been explained above with reference to a few exemplary embodiments of the present invention. Color components (Cb, Cr) may be implemented as the pixel values for the detection and correction of the chroma wrinkles.

The invention claimed is:

1. An image display apparatus, comprising:
   a detecting unit which detects whether chroma wrinkles exist in blocks, using decoding information acquired from an input image and pixel values of the input image; and
   a correction unit which corrects the chroma wrinkles of the blocks, the detecting unit detects that the chroma wrinkles exist in the blocks,
   wherein the detecting unit determines that the chroma wrinkles exist in the blocks, if discrete cosine transform (DCT) energies of first columns of first and last rows of the blocks exceed a predetermined reference energy, and if DCT energies, excluding the first columns of the first and last row of the blocks, are close to 0.

2. The image display apparatus of claim 1, wherein the detecting unit further comprises a computation unit which computes the discrete cosine transform (DCT) energies of the blocks using the decoding information, computes pixel sums using the pixel values, computes first and second averages of pixel sums using the pixel sums, and computes differences of average pixel sums of even fields and odd fields using the first and second averages of pixel sums, and the correction unit adjusts the pixel sums of the even fields close to the first average of pixel sums of the even fields, if the detecting unit detects the chroma wrinkles in the blocks, and adjusts the pixel sums of the odd fields close to the first average of pixel sums of the odd fields computed by the computation unit.

3. The image display apparatus of claim 2, wherein the computation unit computes the pixel sums by adding the pixel values of the respective lines of the even fields and the odd fields, computes the first average of pixel sums by adding the pixel sums of the lines, excluding the first and last lines, of the even fields and the odd fields and averaging the obtained sum, computes the second average of pixel sums by adding the pixel sums of the first and second lines and averaging the obtained sum, and computes the difference of average pixel sums based on the difference between the first and second averages of pixel sums.

4. The image display apparatus of claim 2, wherein the detecting unit further comprises a comparison unit which compares the DCT energies computed by the computation unit with a predetermined reference energy, compares motion vectors of the blocks with first and second predetermined reference motion vectors, compares quantization coefficients of the blocks with a first and a second predetermined quantization coefficients, and compares the differences of average pixel sums of the even fields and the odd fields with a predetermined reference pixel difference, and
   the correction unit, according to a result of the comparisons by the comparison unit, adjusts the pixel sums of the even fields close to the first average of pixel sums of the even fields computed by the computation unit, and adjusts the pixel sums of the odd fields close to the first average of pixel sums of the odd fields computed by the computation unit.

5. The image display apparatus of claim 2, wherein the detecting unit further comprises a comparison unit which compares the DCT energies computed by the computation unit with a predetermined reference energy, compares motion vectors of the blocks with a first and second predetermined reference motion vectors, compares quantization coefficients of the blocks with a first and second predetermined reference quantization coefficients, and compares average pixel differences of the even fields and the odd fields with a predetermined reference pixel difference, and the correction unit, upon determination that the first average of pixel sums exceed the second average of pixel sums according to a result of the comparisons by the comparison unit, adjusts the pixel sums below the first average of pixel sums of the even fields, close to the first average of pixel sums, and adjusts the pixel sums exceeding the first average of pixel sums of the odd fields, close to the first average of pixel sums.

6. The image display apparatus of claim 2, the detecting unit further comprises a comparison unit which compares the DCT energies computed at the computation unit with a predetermined reference energy, compares motion vectors of the blocks with first and second predetermined reference motion vectors, compares quantization coefficients of the blocks with first and second predetermined reference quantization coefficients, and compares the average pixel differences of the even fields and the odd fields with a predetermined reference pixel difference, and the correction unit, upon determination that the first average of pixel sums is below the second average of pixel sums according to a result of the comparisons by the comparison unit, adjusts the pixel sums exceeding the first average of pixel sums of the even fields, close to the first average of pixel sums, and adjusts the pixel sums below the first average of pixel sums of the odd fields, close to the first average of pixel sums.

7. The image display apparatus of claim 4, wherein the detecting unit further comprises a determination unit which determines that chroma wrinkles exist in the blocks, if the DCT energies of first columns of first and last rows of the blocks being compared by the comparison unit exceed the predetermined reference energy, and if the DCT energies, excluding the first columns of the first and last rows of the blocks, are close to 0, determines that the chroma wrinkles exist in the blocks, if the average pixel differences of the even fields and the odd fields being compared by the comparison unit exceed the predetermined reference pixel difference.

8. The image displaying apparatus of claim 4, wherein the correction unit makes a final determination that the chroma wrinkles exist in the blocks, if the motion vectors of the blocks being compared at the comparison unit are between the first and second predetermined reference motion vectors, and if the quantization coefficients of the blocks are between the first and second predetermined reference quantization coefficients, and adjusts the pixel sums of the even fields and the odd fields, close to the first averages of pixel sums of the even fields and the odd fields computed by the computation unit.

9. The image display apparatus of claim 4, wherein the correction unit determines that the chroma wrinkles exist in the blocks and conducts low pass filtering of the blocks, if the motion vectors and the quantization coefficients of the blocks compared by the comparison unit exceed the second predetermined reference motion vector and the second predetermined reference quantization coefficient, and determines that the chroma wrinkles do no exist in the blocks, if the motion vectors and the quantization coefficients of the blocks compared by the comparison unit are below the first predetermined reference motion vector and the first predetermined reference quantization coefficient.

10. The image display apparatus of claim 1, further comprising a decoder which recovers the pixel values contained in fields by decoding the input image, and outputs a decoding information acquired from the input image to the detecting unit.

11. The image display apparatus of claim 1, wherein the decoding information comprises at least one of motion vectors, quantization coefficients and discrete cosine transform coefficients of the blocks.

12. A method of correcting chroma wrinkles, the method comprising:
detecting whether chroma wrinkles exist in blocks, using decoding information acquired from an input image and pixel values of the input image; and
correcting the chroma wrinkles of the blocks, if it is determined that the chroma wrinkles exist in the blocks,
wherein the detecting whether the chroma wrinkles exist in the blocks determines that the chroma wrinkles exist in the blocks, if discrete cosine transform (DCT) energies of first columns of first and last rows of the blocks exceed a predetermined reference energy, and if DCT energies, excluding the first columns of the first and last rows of the blocks, are close to 0.

13. The method of claim 12, wherein the detecting whether the chroma wrinkles exist in the blocks further comprises computing the discrete cosine transform energies of the blocks using the decoding information, computes pixel sums using the pixel values, computing first and second averages of pixel sums using the pixel sums, and computes differences of average pixel sums of even fields and odd fields using the first and second averages of pixel sums, and
wherein the correcting the chroma wrinkles of the blocks adjusts the pixel sums of the even fields close to the first average of pixel sums of the even fields, if the it is detected that the chroma wrinkles in the blocks, and adjusts the pixel sums of the odd fields close to the first average of pixel sums of the odd fields.

14. The method of claim 13, wherein the pixel sums are computed by adding the pixel values of the respective lines of the even fields and the odd fields,
wherein the first average of pixel sums are computed by adding the pixel sums of the lines, excluding the first and last lines, of the even fields and the odd fields and averaging the obtained sum,
wherein the second average of pixel sums are computed by adding the pixel sums of the first and second lines and averaging the obtained sum, and
wherein the difference of average pixel sums are computed based on the difference between the first and second averages of pixel sums.

15. The method of claim 13, wherein the detecting whether the chroma wrinkles exist in the blocks further comprises comparing the DCT energies of the blocks with a predetermined reference energy, comparing the motion vectors of the blocks with first and second predetermined reference motion vectors, comparing quantization coefficients of the blocks with first and second predetermined quantization coefficients, and comparing the differences of average pixel sums of the even fields and the odd fields with a predetermined reference pixel difference, and
wherein the correcting the chroma wrinkles of the blocks adjusts the pixel sums of the even fields close to the first average of pixel sums of the even fields, according to a result of the comparing, and adjusts the pixel sums of the odd fields close to the first average of pixel sums of the odd fields.

16. The method of claim 13, wherein the detecting whether the chroma wrinkles exist in the blocks further comprises comparing the DCT energies of the blocks with a predetermined reference energy, comparing motion vectors of the blocks with first and second predetermined reference motion vectors, compares quantization coefficients of the blocks with first and second predetermined reference quantization coefficients, and comparing the differences of the average pixel sums of the even fields and the odd fields with a predetermined reference pixel difference, and wherein the correcting the chroma wrinkles of the blocks, upon determination that the first average of pixel sums exceed the second average of pixel sums according to the result of the comparing, adjusts the pixel sums below the first average of pixel sums of the even fields, close to the first average of pixel sums, and adjusts the pixel sums exceeding the first average of pixel sums of the odd fields, close to the first average of pixel sums.

17. The method of claim 13, the detecting whether the chroma wrinkles exist in the blocks further comprises comparing the DCT energies of the blocks with a predetermined reference energy, comparing motion vectors of the blocks with first and second predetermined reference motion vectors, comparing quantization coefficients of the blocks with first and second predetermined reference quantization coefficients, and comparing the differences of the average pixel sums of the even fields and the odd fields with a predetermined reference pixel difference, and wherein the correcting the chroma wrinkles of the blocks, upon determination that the first average of pixel sums is below the second average of pixel sums according to the result of the comparing, adjusts the pixel sums exceeding the first average of pixel sums of the even fields, close to the first average of pixel sums, and adjusts the pixel sums below the first average of pixel sums of the odd fields, close to the first average of pixel sums.

18. The method of claim 15, wherein the detecting whether the chroma wrinkles exist in the blocks further comprises determining that chroma wrinkles exist in the blocks, if the DCT energies of first columns of first and last rows of the blocks exceed the predetermined reference energy, and if the DCT energies, excluding the first columns of the first and the last rows of the blocks, are close to 0, determining that the chroma wrinkles exist in the blocks, if the average pixel differences of the even fields and the odd fields exceed the predetermined reference pixel differences.

19. The method of claim 15, wherein the correcting the chroma wrinkles of the blocks makes a final determination that the chroma wrinkles exist in the blocks, if the motion vectors of the blocks are between the first and second predetermined reference motion vectors, and if the quantization coefficients of the blocks are between the first and second predetermined reference quantization coefficients, and adjusts the pixel sums of the even fields and the odd fields, close to the first averages of pixel sums of the even fields and the odd fields.

20. The method of claim 13, wherein the correcting the chroma wrinkles of the blocks determines that the chroma wrinkles exist in the blocks and conducts low pass filtering of the blocks, if the motion vectors and the quantization coefficients of the blocks exceed the second predetermined reference motion vector and the second predetermined reference quantization coefficient, and determines that the chroma wrinkles do not exist in the blocks, if the motion vectors and the quantization coefficients of the blocks are below the first predetermined reference motion vector and the first predetermined reference quantization coefficient.

21. The method of claim 12, further comprising recovering the pixel values contained in fields by decoding the input image, and outputting decoding information acquired from the input image.

22. An apparatus for detecting chroma wrinkles, the apparatus comprising:

a decoder which recovers pixel values contained in fields by decoding an input image, and outputting decoding information acquired from the input image; and a detecting unit which detects whether chroma wrinkles exist in blocks, using the decoding information and the pixel values, wherein the detecting unit determines that the chroma wrinkles exist in the blocks, if a discrete cosine transform (DCT) energy of first columns of first and last rows of the blocks exceed a predetermined reference energy, and if a DCT energy, excluding the first columns of the first and last rows of the blocks, is close to 0.

23. The apparatus of claim 22, wherein the detecting unit further comprises:

a computation unit which computes the discrete cosine transform (DCT) energies of the blocks using the decoding information, computes pixel sums using the pixel values, computes a first and second averages of pixel sums using the pixel sums, and computes average pixel differences of even fields and odd fields constituting the input image, using the first and second averages of pixel sums;

a comparison unit which compares the DCT energies of the blocks, compares motion vectors of the blocks with a first and second predetermined reference motion vectors, compares quantization coefficients of the blocks with a first and second predetermined reference quantization coefficients, and compares the average pixel differences of the even fields and the odd fields with a predetermined reference pixel difference; and a determination unit which determines whether the chroma wrinkles in the blocks according to a result of the comparison by the comparison unit.

24. The apparatus of claim 23, wherein the determination unit determines that the chroma wrinkles exist in the blocks, if the DCT energies of first columns of first and last rows of the blocks exceed the predetermined reference energy, and if the DCT energies, excluding the first columns of the first and last rows of the blocks, are close to 0, and determines that the chroma wrinkles exist in the blocks, if the average pixel differences of the even fields and odd fields exceed the predetermined reference pixel differences, respectively.

* * * * *